United States Patent [19]
Fennesz

[11] Patent Number: 4,576,221
[45] Date of Patent: Mar. 18, 1986

[54] SYSTEM FOR TEMPERING A ROOM

[76] Inventor: Manfred Fennesz, Damböckgasse 4, A 1060 Vienna, Austria

[21] Appl. No.: 554,093

[22] Filed: Nov. 21, 1983

[51] Int. Cl.⁴ .............................................. F24D 19/02
[52] U.S. Cl. ........................................ 165/49; 237/69; 237/1 R; 165/168
[58] Field of Search .................. 237/69, 1 R, 46; 165/49, 47, 48 R, 168, 136

[56] References Cited

U.S. PATENT DOCUMENTS

| | | | |
|---|---|---|---|
| 2,205,001 | 6/1940 | Timmis et al. | 237/69 |
| 2,512,854 | 6/1950 | Edgerly | 237/69 |

FOREIGN PATENT DOCUMENTS

| | | |
|---|---|---|
| 359696 | 8/1976 | Austria . |
| 1929529 | 12/1970 | Fed. Rep. of Germany . |
| 2604782 | 8/1977 | Fed. Rep. of Germany . |
| 2373026 | 6/1977 | France . |
| 8300544 | 2/1983 | PCT Int'l Appl. . |
| 617999 | 6/1980 | Switzerland . |

Primary Examiner—Henry Bennett
Attorney, Agent, or Firm—Ostrolenk, Faber, Gerb & Soffen

[57] ABSTRACT

The system for controlling the temperature of a room, which comprises at least one duct provided in a surface of the room, especially in the floor, and at least one temperature-controlling device extending in this duct whereby the air can be circulated through this duct, provides for at least one baffle (3) in the duct (4) which deflects or diverts the air from its main direction of flow defined by the connection of the intake opening with the discharge opening. The duct (4) can be limited on the side facing the room by a covering made of heat-conducting or heat-retaining material. In a particularly suitable embodiment the temperature-controlling device (1) is disposed in the duct (4) in the form of a cable or hose; its outside diameter—or the outside diameter of a heat-conducting plate (27, 27') which preferably encompasses the device at least partly and which is in particular at least partially black—is slightly larger than the distance between the alignments of the baffles (3).

15 Claims, 17 Drawing Figures

Fig. 1
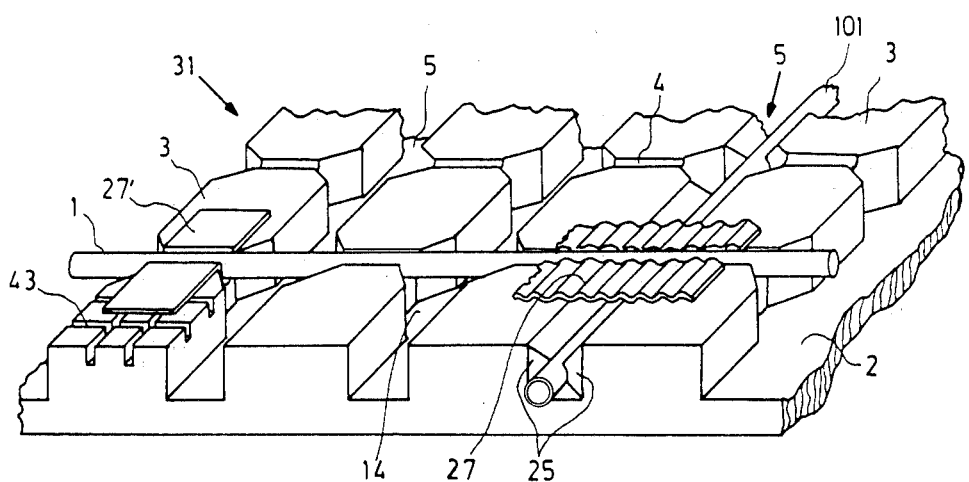
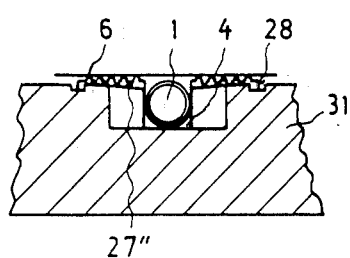
Fig. 2A
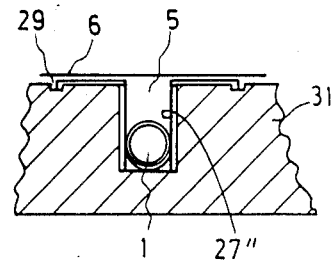
Fig. 2B
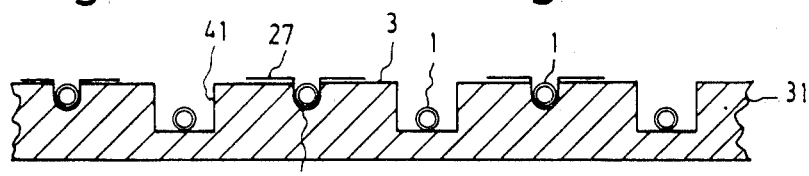
Fig. 3A
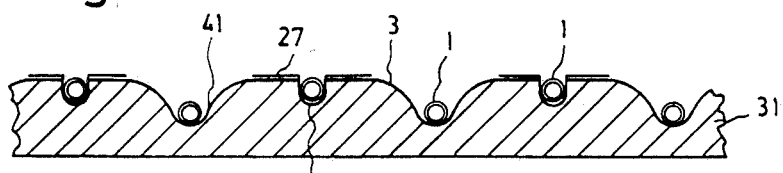
Fig. 3B

SYSTEM FOR TEMPERING A ROOM

The innovation relates to a system for tempering a room with at least one duct space foreseen in a closure of the room, especially in the floor, and at least one tempering device extending in said duct space, whereas air can be circulated through the duct space.

Such a system has become known from Austrian Pat. No. 359.696. Although this patent relates especially to a radiation and convection heating system, it is clear that the term "heating system" is to be understood in the most general context, namely in the context of an installation, with the aid of which it is possible to maintain the room temperature at a predetermined level. This temperature level can lie blow the outside temperature if, say, a coolant, e.g. cold water, is passed through a tubular heating string instead of a heating medium such as hot water or steam.

In addition, the aforementioned Austrian patent relates especially to a floor heating system, but in this context it is only essential that the tempering space in which the system itself is accomodated, have a convectional connection with the room to be tempered so that the system can analogously be accommodated in a side wall as well as in the ceiling of the room. In this situation the convection connection can exist directly, or just as well indirectly, i.e. one of the discharges can lead into say an adjoining room, from where temperature equalization is then effected via open doors or other openings. Even though in the scope of this patent circulation of fresh air is not foreseen, a certain portion of such air can possibly be added to the room air, which can be essential i.e. in particular for adherence to the regulations of the construction and/or trade authorities.

One of the advantages of this known tempering system is that the heat is rejected by the heating line into the room (or vice versa) more rapidly and with fewer losses. The heat transfer rate is naturally largely dependent upon the flow velocity of the air, which can be circulated by natural convection or also by mechanical means. Just in the former case, however, the flow velocity can be very low, which due to the nature or form of the heating line or for other reasons can lead to the occurrence of temperature differences inside the duct or the duct system forming a duct space. In this context the term "heating line" is to be understood in its general meaning as a tempering element, the extension which is considerably greater in one direction than in the other. For this reason surface-type tempering elements can also be regarded as such. Although such surface heaters have a lesser inclination to build up temperature differences of greater magnitude, temperature differences can occur with these heaters as well. As such, however, temperature differences are undesirable because heat losses can thereby be incurred.

It is the object of the present invention to provide for an improved temperature equalization within or at the surface of the duct space discharging into the or a room, which is accomplished by the present innovation by the provision of at least one baffle being foreseen in the duct space, said baffle deflecting or diverting the air from its main direction of flow defined by the connection of the intake with the discharge opening, to the side in the plane of the room closure. Baffles deflecting upward are known from French Pat. No. 2,373,026, but they cannot produce a temperature equalization, all the more because these are in fact only vertical bends in the ducts. The horizontal diversion produces vortexing and a mixture of air from those areas in which the heat radiation toward the room is non-uniform.

Amongst other capabilities the system according to the present invention enables the air circulating through the ducts to be simultaneously filtered and/or degerminated, as well as humidified if called for, to be charged with odor killers and/or scents etc. Finally, warm air obtained from low-temperature heating systems such as e.g. solar collectors can be circulated directly, affording especially economic utilization of existing energy; in addition the air can be forced through the duct spaces, or drawn through the duct spaces from the discharge end by means of either natural or mechanical ventilation.

The interconnection of elongated, duct-type floor spaces of a floor heating system is known, but with the known constructions temperature equalization between two points of different heating system temperature level is difficult or even impossible because of a lack of convection flow. This effect is achieved, however, when a tempering system of the type mentioned above is used, because with this system the said flow is provided. Up to this time the problem solved by the invention, as well as the necessity of an optimation in this direction, has apparently not been realized at all.

Relating to an advantageous constructional configuration of the invention the duct space discharging into the or a room exhibits at least two, especially parallel to one another duct sections, whereas the baffle(s) form(s) at least one transverse duct connecting the duct sections. In the framework of the invention namely, a problem arises due to contradicting requirements insofar as one the one hand the cavity for the longitudinal and transverse circulation should be as large as possible and free of flow obstacles, but on the other hand support at as many points as possible is required for the duct space for reasons of statics. This problem is solved by the characteristics given above. In this case the transverse ducts are obtained most simply by the duct space discharging into the or a room, as well as the transverse ducts on two sides perpendicular to one another, are limited by at least one plate of known-type having baffles configured as stays arranged at predetermined distances to one another, especially of rounded cross-section in plan view. In this way the formation of the ducts and the installation of the tempering system which is the object of the present innovation is facilitated, whereas especially in the case of a rounded cross-section of this cam- or pad-type stay it can simultaneously serve as a template for any heating and/or cooling line bends. This applies especially when the pad-type stays have rigid side walls of known type which are perpendicular to the plane of the plate, hence for example which are manufactured with the plate of concrete or synthetic resin hard foam. However, the rounded cross-section also provides a manufacturing advantage if the stays are manufactured in a metal plate by deep drawing, because with a rounded cross-section tearing of sharp edges is scarcely to be apprehended.

Installation of the system is facilitated further if the especially pad-type baffles are spaced from one another such that the alignment lines of their side walls which are about perpendicular to the plane of the plate are offset from one another by a distance corresponding to at least the thickness of the heating and/or cooling line. With a known pad plate the pads are arranged staggered in narrow rows such that the heating line must be wound snake-like amongst them. Insertion of the heating coil is thereby greatly obstructed. Conversely, by virtue of the configuration of the present innovation the work is not only facilitated, but in addition a duct of sufficient size and in particular not obstructing the convection by unnecessary flow resistance is created, which relating to a continuation configuration is preferably to be sized such that the alignment line spacing and the height of the baffles form a duct space, the cross-section of which is at least twice, especially four times, as large as that of the heating and/or cooling line. The best results were obtained with an air duct cross-sectional area four times as large as atmospheric pressure or related to atmospheric pressure. By virtue of the fact, however, that good temperature equalization is achieved by the cavities for transverse circulation foreseen by the present innovation and especially by the transverse ducts, if desired the cross-sectional area can also be sized only twice as large as the heating and/or cooling line without the reduction in capacity from the sizing first mentioned being all too great. This can even be an advantage if narrow installation of single heating line parallel to one another is desired, because they can then be arranged even closer together, whereby the heating per running meter to be performed by one heating line may be less, which in turn reduces the heat losses. Under these circumstances clamping elements can also be foreseen to hold the heating and/or cooling line as will be described later. In the case of narrow installation however, it is of advantage for the height of the baffles to be twice as large as the thickness of the heating and/or cooling line because a large cross-section is thereby provided for the air in spite of the narrow installation.

As has been observed points of different temperature level occur primarily where the line has a bend, for which it is preferred that at least one transverse duct be foreseen in the area of a bend of the heating and/or cooling line or in the vicinity of this area.

However, the innovation also relates to a tempering system construction, preferably for a radiation- and convection-type floor heating system, consisting of
  (a) a plate with projections, preferably of insulating material, between the projections of which at least one air-passage duct space is formed, and
  (b) at least one line-shaped tempering device extending in recesses of the plate, and
  (c) a covering resting on the projections, said covering possibly encompassing a pressure distribution layer.

As can be taken from the above statements the recess in the insulating plate was originally sized large enough that the heating line could just fit into it or had to be wound snakelike to have as large a surface as possible available for seating the covering. This means, however, that only the bare upper side of the heating line radiated onto the lower side of the covering so that the heating line often had to be operated with considerable overtemperature, which means a waste energy, and furthermore, as previously mentioned, considerable temperature differences ensued between the pieces of covering of the fllor or of the respective wall which are located immediately above the heating line and between two heating lines.

If the recess for installing the heating line is now extended, however, to a duct space with air passage connected to the room to be heated as per the proposal contained in the aforementioned Austrian patent, the overtemperature of the heating line can thereby be dissipated by the passing air, but in practice complicated holding devices for the heating and/or cooling line must be foreseen in the duct space.

Therefore, in order to provide for a mounting inside a duct space with air passage and which is hence relatively wide as opposed to the heating coil, said mounting being reliable, easy to install and cheap, and possibly to provide for further equalization of the temperature over the wall or floor surface, the construction of the present innovation can be configured such that at least one recess of the plate itself or a lining thereof accommodating a line-shaped tempering device exhibits on at least one side a limiation fitted with clamping elements.

This is preferably realized in the manner that the outside diameter of the line-shaped tempering device or a heat conducting plate preferably encompassing the device at least partly, which is especially at least partially black, is slightly larger than the distance between the alignment lines of the limitations of the recess foreseen for the installation of said device. Heat conducting plates are elements which are occasionally used for tempering systems, which has become known, e.g. from Swiss Pat. No. 617,999 or French Pat. No. 2,201,447. However, in the aforementioned publications such a dimensioning is not given, but rather the arrangement of relatively wide, elongated parallel ducts over which equally long heat conducting plates are installed, whereas due to the wide dimensioning of the recesses forming the ducts, said ducts cannot exert clamping action.

The aforementioned dimensioning of the alignment lines can be realized either by the recess provided for installation of the string-type tempering device being a wavy- or zigzag-shaped duct space. Preferably seen from above, whereas the wave peaks form the clamping elements, and/or by pad-like projections—preferably staggered—being arranged on the plate to form the clamping elements, and by these pad-like projections consisting expediently of heat retaining material, in the cases of which an especially favorable temperature equalization is obtained. For the installation of the string-type tempering device, however, a recess arranged in an angle to the air-passage duct space on the upper side or the projections, furnished with or limited by lateral clamping elements, can be foreseen, whereas the duct space is expediently expanded in cross-section at that point at which it is crossed by the heating and/or cooling string.

These measures eliminate with one stroke all shortcomings to date:
  The duct space can be dimensioned large enough to accommodate the amounts of air expanding during warm-up without the carrying capacity of the projections for the covering being reduced, since the clamping elements hold the heating string;
  On installation the heating and/or cooling string is clamped in the recesses provided therefor without complicated holding devices being required.
  The possibly wave-shaped duct space and/or its expanded cross-section, as well as the heat conducting plate preferably used, also distribute the temperature to pieces of the covering located between two heating and/or cooling strings better than conventional constructions;
  At that point at which the heating and/or cooling string crosses the duct space it is advantageous to arrange a heat conducting plate which simultaneously performs two functions: it improves the carrying capacity for the piece of covering located above the expanded duct space, and it brings the heat from the sections of heating string running through the recesses of the projections into the duct space, from where it can be removed or distributed by the passing air.

The expansion of the duct space at that point at which it is crossed by the heating and/or cooling string is expedient because there for the passing air the crosss-section would be reduced by the string. Otherwise, however, this variant also provides the advantage that the duct space cross-section, which with a string installed inside the duct space should have, as mentioned, about four times the cross-section as the string, can be reduced further and for example to 3 times the cross-section. It should only be expanded at the crossing points so as to improve the carrying capacity of the remaining projections.

With or without a heat conducting plate the heating and/or cooling string can be installed on the floor of the air-passage duct space or—held by a heat conducting plate in any case—on the upper side of the duct space, in which said case the duct space itself has the clamping elements or is limited by them at least partly. However, the string can run at an angle to the duct space, in which case it crosses the duct preferably in the upper half of the duct and is held in the recesses of the projections, especially with the aid of a heat conducting plate which conducts the heat to the surface of the projections.

Relating to an advantageous configuration of the innovation for clamping above a first heating and/or cooling string a second heating and/or cooling string runs preferably diagonally to the first string which is especially installed at a height corresponding to the diameter of the first string. Insofar as the second string is not installed at the preferred height, this arrangement facilitates in any case clamping to be effected by means of clamping strips of metal sheet or similar material inserted between both strings at the crossing points. In rooms with a high heat requirement, or to work with lowest possible input temperature (which is often advantageous when using warm disposal water or solar collectors) a first heating string in the duct space and a second string at an angle thereto can hence naturally be foreseen, producing a very uniform surface temperature of the floor or wall covering. In this case the first heating string can be routed below, and the second string above the first. Alternatively the first heating string is held in heat conducting plates, parallel to the duct space in its upper half and bridging the duct space, while the second heating string is routed on the floor of the possibly deeper but in any case narrower recess arranged at an angle to the duct space. These recesses then form transverse ducts which also exhibit air passage and which separate the pad-like projections.

In certain cases it has also proven to be expedient if grooves are provided in the surface of the projections which preferably extend continuously from one edge to the other (opposite) edge. This provides for better distribution of the heat from the air-passage duct space to the floor covering parts located above the projections, or for better heat transfer to the heat conducting plates possibly foreseen on the surface of the projections.

Details of the innovation are illustrated in the following description of construction examples shown schematically in the drawing.

FIG. 1 shows a perspective view of a construction of the present innovation, including heating strings and heat conducting plates;

FIGS. 2A and 2B show special air duct shapes;

FIGS. 3A and 3B show examples of cross-section through the bearing surfaces;

FIGS. 4 to 7 show various construction examples of pad-like bearing surfaces with projections acting as clamping elements;

Figure 12:
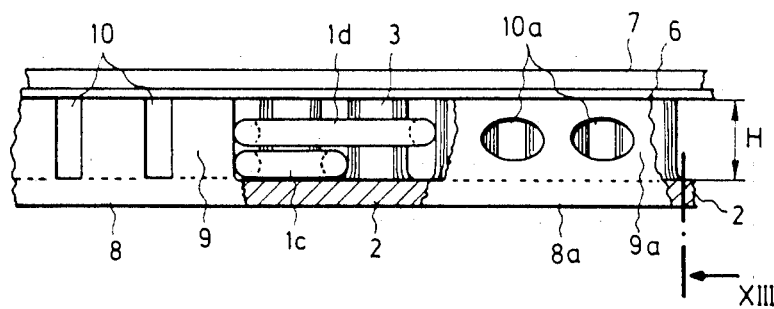
FIG. 12 shows a view representing about the perspective of arrow XII of FIG. 11, whereas two border plate constructions and the attachment of two heating and/or cooling strings in a single duct of a pad plate are shown.
Figure 13:
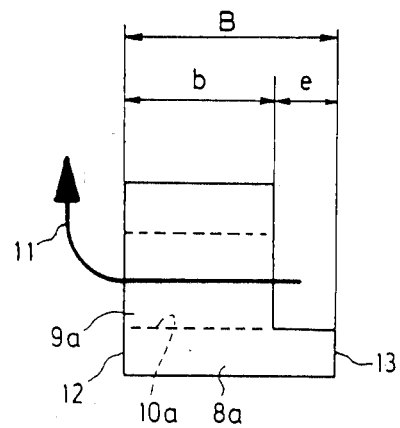
Figure 14:
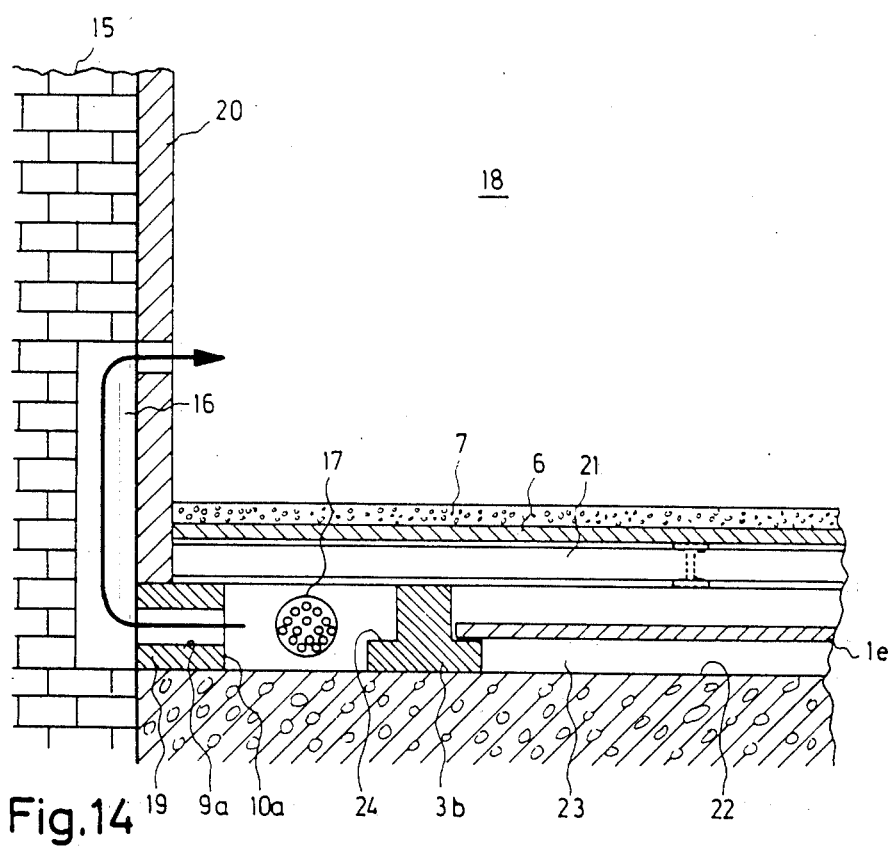

FIG. 13 shows a view from the perspective of arrow XIII of FIG. 12 of a configuration of the border plate preferentially used according to the present innovation; and FIG. 14 shows a further cross-sectional view of a tempering system according to the present innovation, wherein parts with identical function are respectively designated with the same reference symbols, possibly supplemented by index symbols.

FIG. 1 shows a construction 31 for a radiation and convection heating system, the bearing surfaces 3 of which are made for a floor covering or attic not shown, said surfaces being preferably pad-like, possibly of heat retaining material and are interrupted by air ducts 5 and by recesses 4 for heating strings 1.

The recesses 4 end about at middle height of the pads 3 so that the latter are divided into 2 half-pads. Half the height from the base of the recesses 4 downward corresponds preferentially to the diameter of the heating string 101 located in air duct 5 perpendicular thereto, so that said string is also clamped by the overlying heating string 1, even though the pads 3 can also be furnished with lateral projections 25 acting as clamping elements. Alternatively, string 1 is foreseen as the sole clamping element for the underlying heating string 101.

When setting up construction 31 from prefabricated plates 2 one can proceed in such a manner that first these plates 2 are installed, then the lower heating element 101 is fastened with the clamping elements 25, and on top a heat conducting plate 27 or 27' is clamped in the recess to distribute the heat. When a relatively short heat conducting plate 27' is used, such a plate is to be clamped in intervals between every two pad projections 3. If the recess 4 is too wide to directly exert a clamping force itself, the heat conducting plate 27 can—in the area of its longitudinal depression accommodating the heating string 1—either be corrugated as shown, or furnished with clamping elements—such as projections, continuations or the like—against the recess 4 and the heating string 1.

In this way the heat removal is simultaneously improved by the enlarged surface. This can be especially effective if, say, the heating string 101 is omitted and the duct 5 is hence free to accommodate longitudinal ribs projecting downward from heat conducting plate 27' which possibly rest on the floor of the duct 5, thereby contributing to carrying capacity. The duct 5 can then however also be used to accommodate an air humidifier.

Contrary to previously known constructions, construction 31 has firm support, and heating string 1 only has to be inserted into heat conducting plate 27 or 27', which can be black on at least one surface (directed toward one of the heating strings 1 or 101) for better absorption of the heat radiation emitted by heating string 1. If the arrangement with the clamping elements 25 is not used (which if desired need not be constructed as a single piece with the pad-like projections 3, but if desired can be inserted with the heating line for which circumstance the vertical side walls of the projections 3 extend slightly V-shaped downward so that the clamping is assured on the one hand, and removal from the mould is facilitated on the other) the duct 5 accommodating the heating line 1, and the recess 4 as well, can be lined or coated with reflection material.

At the crossing zones 14 of the heating strings arranged in two levels, the cross-section of the air ducts 5 is expediently enlarged to avoid any possible heat buildup at these points which could occur due to the reduction of the duct cross-section through the diagonally traversing heating string. This enlargement can be a widening—as shown in FIG. 1—; alternatively, the duct space 5 in the crossing zone 14 can also be increased in depth (not shown). The crossing areas 14 are preferably covered with heat conducting plates 27, to assure a stable support for the floor covering not shown. Precisely for this reason the heat conducting plate must lie snug and may not slip.

The surface of the pads 3 can exhibit grooves which admit an increased amount of heated air to an overlying floor covering or to the heat conducting plate 27', thereby further improving the efficiency of the heating system. These grooves 13, even though only shown in FIG. 1, can naturally also be provided with all other constructions of the pads 3.

FIGS. 2A, 2B each show a construction 31 with a wide, shallow or with a narrow, deep cross-section of the air ducts 5 in which the heating strings 1 or 101 are embedded and which are crossed preferbly at an angle of 90° by a further heating string not shown in a lower (FIG. 2A) or a higher (FIG. 2B) level, similar to the representation in FIG. 1 of heating strings 1 and 101, and which then are clamped in the recesses of the pad profile forming clamping elements provided for this purpose. With the configuration according to FIG. 2B two heating strings can also be installed one above the other so that e.g. the delivery and return lines of a heat transport medium are installed one above the other. In this case space is still available between or adjacent to the strings for the air convection.

Here, the heat conducting plates 27" exhibit bending 28 of the lateral edges with which they are anchored in slots 29 of the construction 31. These slots can be formed by the grooves 13 or correspond to them. With the construction according to FIG. 2A the heat conducting plate 27" is corrugated at least at its side wings to improve heat rejection, but a corrugation (possibly in longitudinal instead of transverse direction) in the area surrounding heating line inserted into the recess 4 can contribute to clamping in this recess.

Alternatively or additionally, for example, small ribs also projecting into the duct from the heat conducting plate can be foreseen to improve the heat rejection. A further heat conducting plate 6 forming a cover can serve as a base for an attic or a floor covering. A solid and sturdy base is created for this plate 6 as well by the good cohesion of the substructure by the clamping effect. With the heat conducting plate 27" correspondingly clamped in the edging 28 is possibly indispensable. Alternatively the existing wings of the heat conducting plate can also not project out of the duct, but are hooked fast on the two vertical duct walls, and thereby serve as a clamping element.

With the construction 31 according to FIGS. 3A and 3B the heat conducting plates 27 are clamped in the recesses 4 with the heating lines 1 installed in the upper level, whereas in FIG. 3A the profile 41 of the construction 31 exhibits a rectangular, if desired slightly trapezoidal upward tapering and conversely in FIG. 3B an arched cross-section, which in the latter two cases can in any case facilitate removal from the mould in manufacture.

Figures 4, 5A, 5B:
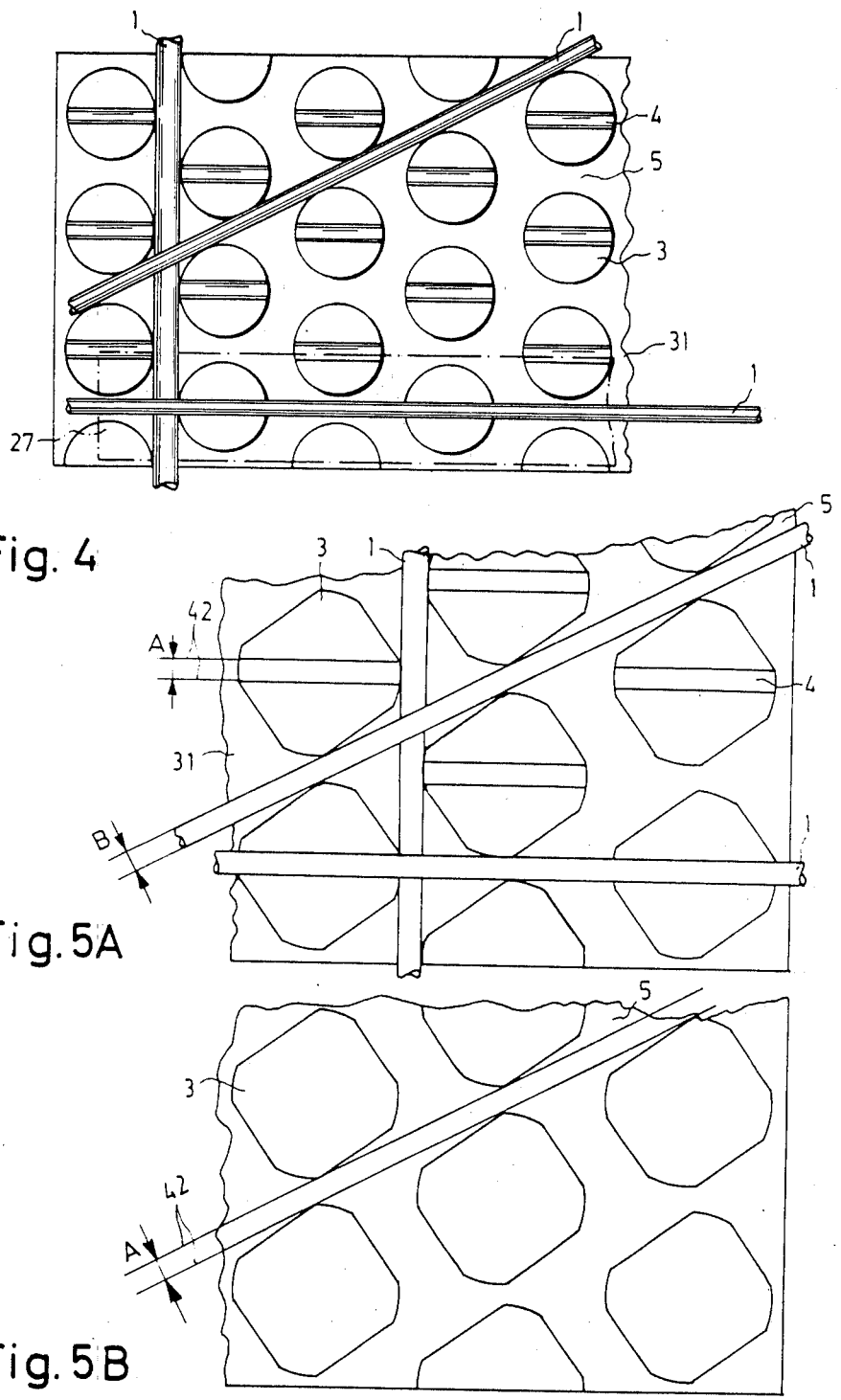

In construction 31 according to FIG. 4 circular pads 3 (seen in plan view) are present, which are arranged such that the heating strings 1 are installed in two levels, as well as clamped between the pads 3 or in their recesses 4, the pad paunches directed toward the heating string 1 forming the clamping elements. The spaces between the pads 3 acts as an air duct 5.

FIGS. 5A, 5B show two variants of pad (3) construction, which in FIG. 5A are furnished with a recess 4 to accommodate an additional heating string 5 in a second level, while the pads 3 in FIG. 5B only permit the clamping of heating strings 1 in a single level. Here, the distance A between the two alignment lines 42 is somewhat smaller than the diameter B of the heating strings 1, the corners of the pads shown acting as clamping elements. If desired, heat conducting plates can be used here as well.

Figure 6:
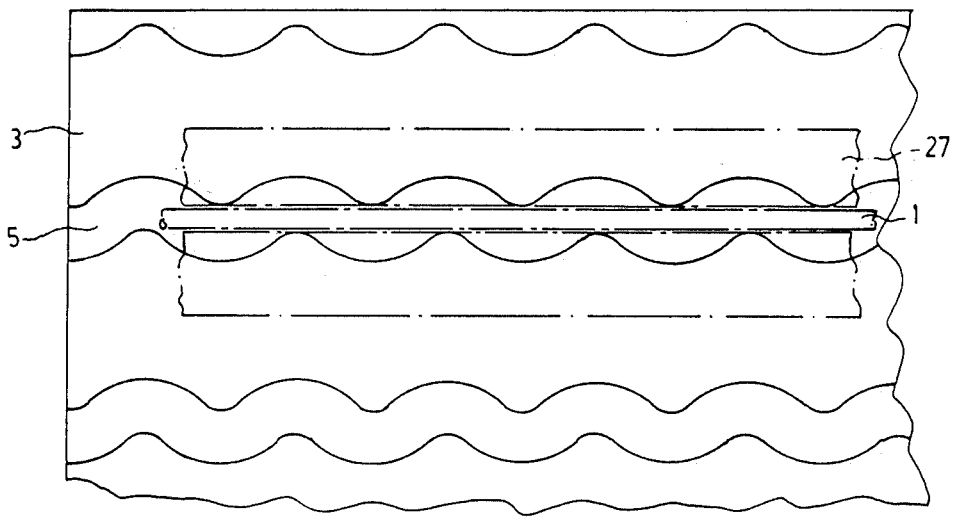

FIG. 6 shows a further type of construction with which the air ducts 5 are wound snake-like, whereby the supporting surfaces are formed as arched or corrugated pad bands 3. Constructions with and without the use of heat conducting plates are possible here as well as shown by the dash-dot line.

Figure 7:
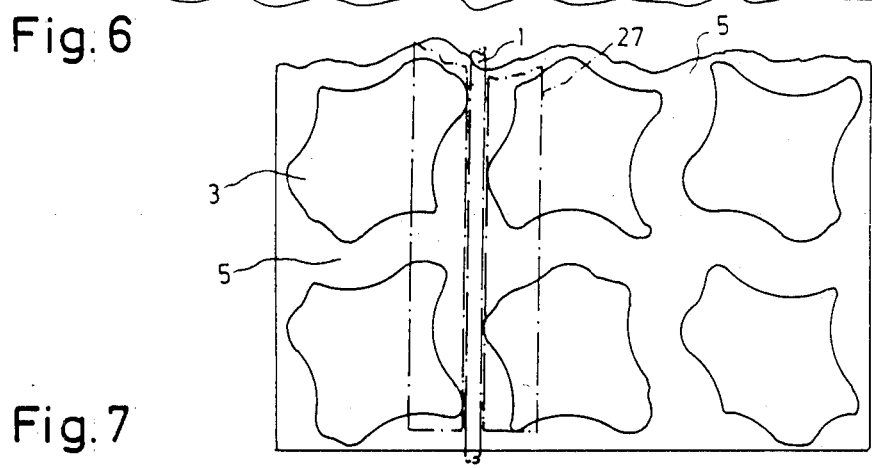

A further development of the above can be seen in FIG. 7, the pads 3 of which appear to be irregular, but which are formed by the intersection of two wavy-line ducts 5, so that every fourth pad is actually identical. For the heat conducting plate 27 or the overflying floor structure improved supporting and greater carrying and walking strength is achieved because even with a heavier load bucklings along the duct are less easily possible.

Figure 8:
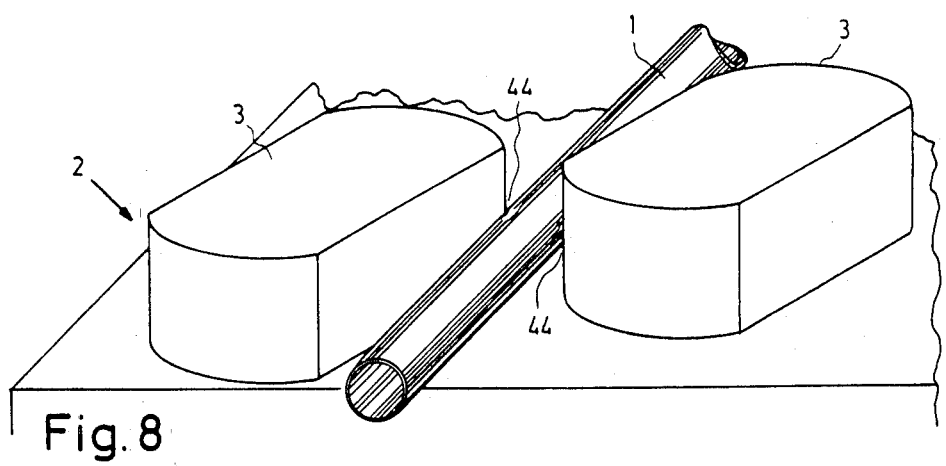
FIG. 8 shows a perspective view of a heating string clamped between two pads.

The plate 2 in FIG. 8 shows two pad-like projections 3, between which the heating line 1 is again clamped in at the corners 44 because its outer diameter is slightly larger than the distance of the alignment lines of these two projections 3 with the remaining projections (not shown) forming the left and right limitation of the duct accommodating the heating string 1.

Figure 9:
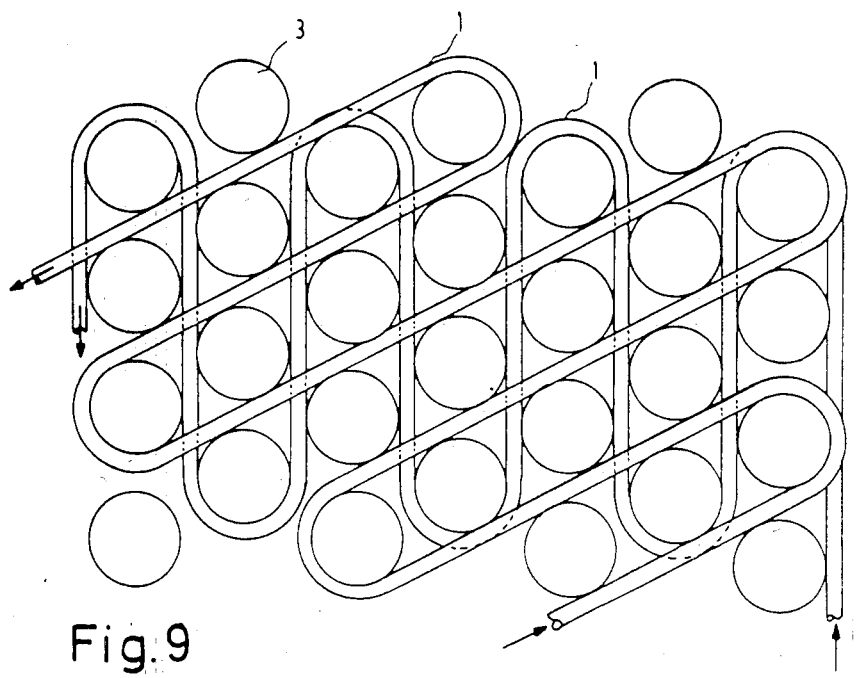
FIGS. 9 and 10 show special types of heating string installation.
Figure 10:
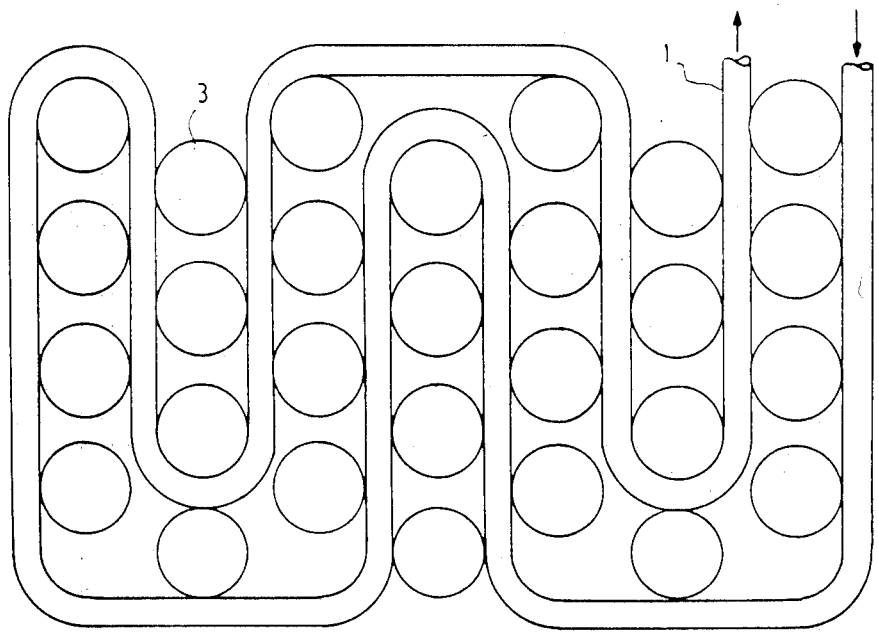
Figure 11:
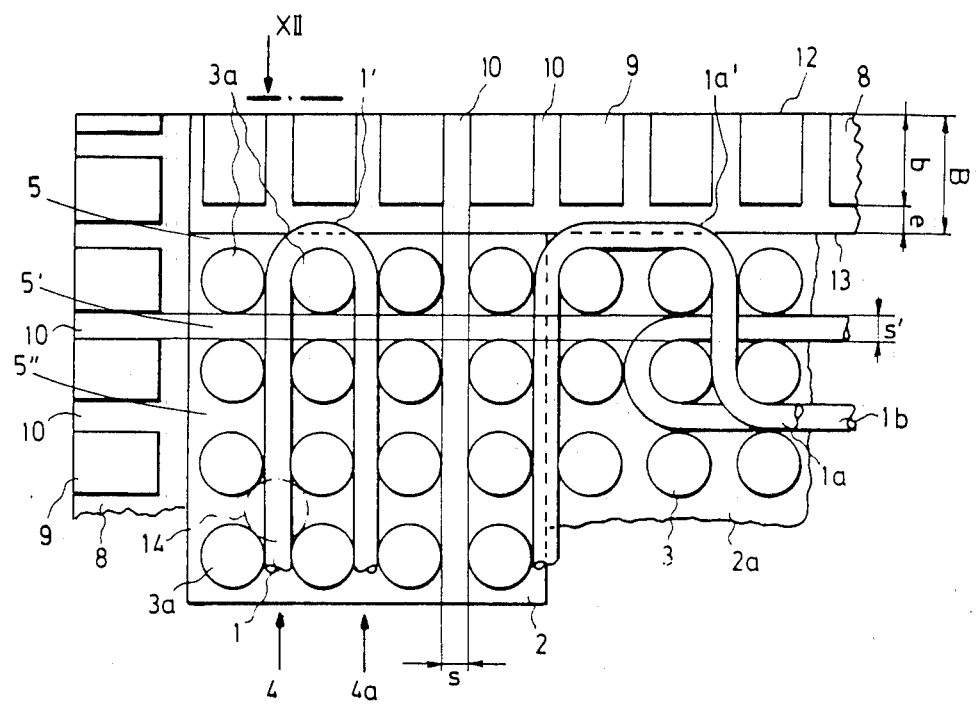
FIG. 11 shows a part plan view of another tempering system according to the present innovation after removal of the overlying wall.

FIGS. 9 and 10 illustrate (as well as does FIG. 11) alternative forms of the installation of heating strings 1, whereas especially the uniform and dense distribution of the heating strings 1 in FIG. 10 assures a correspondingly uniform heat distribution at the surface of the floor or of the respective wall. In this context it is mentioned that it is possibly advantageous to foresee dust filters at the ends of the ducts 5 toward the heated room, as will be described later using FIG. 14. Depending on heat requirement, in zones of higher heat requirement all the ducts given on prefabricated plates 2 by the pads 3 can be occupied or even occupied double, while in zones of low heat requirement individual ducts are occupied only singly or not at all, or only every second and third etc. duct is occupied (c.f. FIGS. 9, 11). Meandering, snail-like, horizontal and vertical installation is also possible as easily understandable from FIGS. 9 to 11. The longitudinal and transverse ducts 5 can therewith be of different size and shape, or the duct cross-section can vary in each case as is especially clear from FIG. 1 and the clamping elements 25. In addition, there are three different possibilities for attaching the heating strings 1:

- Either the heating string 1 is clamped directly in the recess 4 or the duct 5 without a heat conducting plate being placed in between,
- or with a heat conducting plate being placed in between, said plate (as plate 27' in FIG. 1) is either clamped between two pads so that adequacy is found with few prefabricated pieces of short metal,
- or the heat conducting plate also bridges the transverse ducts 5 (cf. the heat conducting plate 27 in FIGS. 1, 4 and 7), whereby for the one part increased stability of the substructure is achieved, for the other part large sections must be cut off for adaptation to the respective room dimensions, involving additional labor and material expenditure.

According to FIG. 11 preferably square pad plates 2, 2a are applied to the floor or the respective wall or the ceiling of the room and possibly fastened in a known manner (e.g. on slat grids or similar structures) before the heating and/or cooling strings 1, 1a, 1b are installed. However, the present invention is used preferentially with floor heating systems. A single plate covering the room wall surface could naturally also be used, although such a plate is usually unwieldable. In plan view the pad plates 2, 2a exhibit circular pads 3 arranged at equal distances from one another. Although pads with a rounded cross-section in the plan view, hence with a circular, oval or rectangular cross-section with rounded-off corners are preferred because of the possibility of using them as a template with heating coil bends, they are by no means absolutely necessary, and the pads can just as well have a square or multi-angle cross-section with sharp edges as can be seen from the description of the above figures. With a rounded cross-section, however, not only do these pads 3 act as a template for the bends 1' 1a' of the heating and/or cooling strings, but the danger of edges breaking is also lessened, and especially with conical configuration of the pads mould removal is facilitated.

If prefabricated pad plates 2, 2a are not used, only the ducts 4, 4a need be cut into polystyrol hard foam plates according to the desired path of the heating strings 1, 1a and 1b. According to the present innovation, however, it is foreseen and advantageous that in addition to the ducts 4, 4a etc. for the heating and/or cooling strings 1, 1a, 1b, transverse ducts yielding widened cavities 14 (cf. also FIG. 1) and interconnecting the individual duct sections 4 or 4a be provided, e.g. 5, 5' and 5''. Baffles are thereby created for the air flow, providing for a more uniform distribution of the heat. Here, the transverse duct 5 in the area of the bends 1' and 1a' are of special importance, because according to experience a different temperature level than other regions of the system is most likely to occur in the area of the bends. Instead of the transverse duct 5, however, only the transverse duct 5' which is also very near the bends 1', 1a' could possibly be foreseen.

When pad plates 2 or 2a are not used these transverse ducts 5, 5' or possibly also 5'' are to be cut into the wall base or subfloor, e.g. in a polystyrol or polyurethane plate, and they provide for a transverse flow while simultaneously supporting the overhead wall by the pads 3 remaining in between, said transverse flow producing an improved temperature distribution or heat utilization. It is simpler for installation, however, to use the pad plates 2, 2a. With the construction according to FIG. 11 staggering of the pads 3 as shown in FIGS. 9 and 10 would rather obstruct the formation of a wide stream, all the more because the pad height is not freely optional in every case, for which reason the pad rows are configured in the manner shown in FIG. 11.

The heating and/or cooling line 1 is installed such that there are two parallel duct sections 4, 4a. In principle, however, as shown with the heating and/or cooling string 1a, any type of installation is possible (cf. FIGS. 9 and 10), even say one with which the duct sections stand at an angle to one another as shown in FIG. 9. Only essential for this construction is the fact that the duct space is thereby expanded, that corresponding transverse ducts 5, 5', 5'' are provided between these duct sections 4, 4a, the former providing for a temperature equalization by means of corresponding transverse circulation in addition to the longitudinal circulation in the ducts 4, 4a.

With the preferred construction shown the pads 3 are arranged such that the distance S between the alignment lines of their side walls does not quite correspond to the thickness of the heating string 1, 1a or 1b, but the distance s can also not be quite twice as large as the thickness of the heating and/or cooling string so that 2 such lines can possibly be installed next to one another. If the distance s is somewhat larger than twice the thickness of the heating and/or cooling string as per the constructions already described, however, these strings can also be clamped and held fast by lateral clamping elements 25 or by transversely overlying heating and/or cooling strings or staggered pads 3. Where a less narrow arrangement of the heating and/or cooling strings is required, however, it does not matter if—as mentioned above—the ducts formed between the pad rows remain free; these cavities serve rather for transverse circulation and can possibly also be free of pads.

Of special advantage is also the installation of two heating and/or cooling lines in a duct by means of the pad height being selected correspondingly large (cf. height H in FIG. 12) as can be seen with the strings 1c, 1d. With equally large duct cross-section this allows the side walls of the pads to be arranged narrower for clamping the heating line. The distance s times the height H thereby produce a cross-sectional area for the duct section which, less the cross-sectional area of a string, should be at least twice as large as the latter to assure good air circulation and unobstructed heat transport. It was seen that with atmospheric pressure optimum values are obtained when the free duct cross-section amounts to about four times the cross-section of the heating and/or cooling string, but with mechanical pump circulation the free duct cross-section can be reduced correspondingly without a loss in efficiency.

Since on the one hand the pad row gaps provided as transverse ducts 5', 5'' are possibly used for installation of the strings (cf. heating and/or cooling string 1b), and on the other hand correspondingly wide transverse ducts produce better temperature distribution, the transverse ducts 5, 5' preferably have a widths' equally large as that of the duct sections 4 or 4a, i.e. the distances s and s' equally large. This is by no means an absolute requirement, however; these two dimensions s and s' can rather have different magnitudes, while distance s' is generally selected smaller. However, the arrangement can be such that the distance s' is only equal to distance s about at every second row of pads, and in between it is smaller. In this way at least a part of the transverse ducts 5' or 5'' can have an equally large cross-section as the duct sections 4 or 4a.

A further measure for improved distribution of the temperature consists in the pad plate 2 being covered with heat conducting material as per FIG. 12 with the plate 6 of heat conducting material already described with FIGS. 2A, 2B, said plates consisting e.g. of aluminium, of which material the heat conducting plates 27 and 27' consist. An attic 7 or a prefabricated part floor, and in the case of only a cooling system being installed (preferably in the ceiling of the room) only plasterwork can be foreseen above this aluminium plate 6. Alternatively the covering 6 can consist of heat retaining material, producing a temperature equalization over the operating period, but a covering of heat conducting material is preferred.

When using the pad plates 2 or 2a it is actually quite possible to extend the plates up to the wall of the room. But then the flow emitting at the end of the duct section 4 or 4a etc. would be only poorly directed by the pads 3a standing at the edge, and an undesired vortex formation which obstructs the heat transport could occur. Added to this is the fact that the emitting air should usually be directed upwards with ceiling cooling analogously downward a short distance along the vertical wall (cf. wall 15 m FIG. 14) and from the position of the edge pads 3a can only poorly be supplied to the ascending duct 16 (FIG. 14).

For this reason it is preferably for the edge zones to have the pad plates 2, 2a themselves, or—corresponding to an especially expedient construction—special edge plates 8 or 8a (cf. FIGS. 12, 13) form elements 9 or 9a which limit the duct sections 10 or 10a with walls parallel to one another or to the plane of the pad plates 2 or 2a limiting the ducts, as well as to covering 6 and to the duct sections 4, 4a, and finally also to the transverse ducts 5, 5' and 5''. Two different edge plates 8 or 8a are shown in FIG. 12 as an example of the configuration of the form elements 9 or 9a and the associated duct sections 10 or 10a. Here, not absolute but only approximate parallelism of the side walls of these duct sections 10 or 10a as they can be seen in FIGS. 11 and 13 (with dashed lines) is essential. The duct sections 10 or 10a of the edge plates 9 or 9a preferably align with the ducts of the pad plates 2, 2a to avoid flow resistances by diversion of the air flow.

For the same reason it is also expedient if the cross-sectional area of these duct sections 10 or 10a are about equally large as the cross-sectional area of the ducts 4, 4a or 5, 5', 5'' of the pad plates 2, 2a aligning with them. In this case however, it is also possible to allocate to a duct, e.g. to duct 4 or 4a, of pad plate 2 several thin duct sections of the edge plate, the cross-sectional area of which together expediently corresponds in turn to that of the associated duct 4 or 4a of the pad plate 2. A number of such thin duct sections 17 is insinuated in FIG. 14. In any case the tempered air flows through these duct sections 10 or 10a as shown by the arrow 11 in FIG. 13, and in the case of a heating system upward along this wall as shown in FIG. 14 with the wall 15 and the vertical duct.

It has already been mentioned that the form elements 9 or 9a can also be arranged at the edge of special pad plates. However, installation is simplified if special edge plates 8 or 8a are foreseen which have a width b corresponding essentially to the width b of the form element, in the construction example shown plus a distance e, by which the transverse duct is formed or widened. With this construction the duct section 10 or 10a thereby extends from the outer edge 12 of the edge plates 8 or 8a over a length b and ends a distance e in front of the opposite edge 13 (cf. FIG. 13). However, it can be desirable for the duct section 10 or 10a to end a lesser distance from the edge 12, on order to, say, assure a predetermined distance from the room wall.

It is mentioned that the arrangement of the aluminium plate 6 enlarges the heat conducting surface which is to be ventilated via the transverse and longitudinal ducts 5, 5',5'' or 4, 4a. It is noted that the pad 3 to support this plate 6 need not be of socle configuration as shown, but that other configurations of these stays, possibly a rail shape, are also possible. Especially when the pad plates are made of metal (favoring the temperature distribution) can the pads produced by deep drawing can also be of conical stub shape. It has already been mentioned that when manufactured of other materials this form facilitates from the removal mould. A further possibility is the installation of stays on an even plate spaced as desired as will be discussed later using FIG. 14. The aluminium plate 6 or a heat retaining cover, possibly both, especially one above the other, can then be arranged above the stays. It can furthermore be desirable to arrange the duct sections 10 or 10a oblique to the longitudinal axis of the ducts 4 or 4a, for example several such sections plane-shaped, but preferably extending upward and downward (with cooling). Although it is preferred, such duct sections 10 must not unconditionally, as shown in FIG. 11, also be allocated to the transverse ducts 5, 5', 5''.

In FIG. 14 again a preferred application of the innovation is illustrated, namely with the heating system of a room. In the extension of the room 18 a duct 16 was left free in the vertical wall 15 for this purpose and stays 19 installed at least at two edges of the room, which can be formed e.g. from corresponding edge plates similar to the plates 8 or 8a. In this case an edge spacing e (cf. FIG. 13) is superfluous as discussed below, so that the form elements 9a with their duct sections 10a occupy the entire width of the edge plates 19. If desired, the aforementioned dust filters can then be accommodated inside the duct 16. Either an e.g. prefabricated, plaster plate 20 can be installed on the edge plates 19 as shown, or the floor structure with I beams 21, a cover plate 6 and the attic 7 moves (relating to FIG. 14) to the left and partially limits the vertical duct 16, while the plaster plate 20 moves against it. The I-beams 21 are necessary because with this design a single large cavity 23 is provided between subfloor 22 and floor structure 6, 7, and 21 which permit air circulation not only in the main flow direction from one end to the duct sections 10a of the other end, but in the transverse direction as well, so that temperature equalization inside the cavity 23 is easily obtained. To facilitate this transverse circulation ducts similar to the vertical duct 16 can be provided in the other walls as well, and e.g. thin duct sections 17 to connect the cavity 23 with such lateral vertical ducts can be seen in FIG. 14, which can, for example also lead to the neighbouring room.

Since the cavity 23 offers sufficient space, instead of an elongated heating string a surface heater with an only schematically insinuated heating plate or mat 1e can also be foreseen, also providing a more uniform and lower-loss heating. Naturally, however, radiator-type heating elements can also be arranged in a cavity 23, through the duct system of which a cooling medium can be transported instead of the heating medium, in which case the radiator ribs preferably serve as stays for the cover 6 or similar objects and are hence expediently not sharp-edged in the conventional manner, but configured with a widened bearing surface upward and downward (when being installed in floor or ceiling).

To avoid a heat buildup below the surface heater 1e with possible losses toward the subfloor 22 the heater is preferably arranged in a known manner raised above the subfloor, resulting in ventilation from below as well. For this purpose stay pads 3b are distributed around the edge of the surface heater 1e which are provided with shoulders 24 to support the surface heater 1e. In this way these stay pads 3b perform multiple functions by supporting the surface heater 1e on the one hand and the beams 21 on the other, but they also act as baffles for the passing air flow.

It has already been mentioned that mechanical circulation of the air can be of advantage, for which the circulation pump can then be accommodated in one of the vertical ducts 16. This is especially advantageous if a portion of fresh air is also to be added, all the more because for this purpose only a small opening in the wall 15 is required.

In the scope of the innovation numerous different constructions are possible; observing the clamping element 25 in FIG. 1 it can be realized, for example, that it is generally possible to configure the side surfaces of the pads 3 with a profile forming a clamping element, e.g. wavy- or zigzag-shaped. Moreover, the circular (seen from above) projections 3 can also be arranged according to FIGS. 4, 9 or 10 or unstaggered as in FIG. 11 but correspondingly narrow to exert a clamping action. It is also possible for the pad bands 3 as per FIG. 6 to be made of heat conducting material or preferably of heat retaining material. It is also apparent that details of the constructions shown in the various figures can be combined with one another, for example clamping elements or heat conducting plates in a duct space fitted with baffles. The recesses 4 can also be slightly staggered and arranged and configured in a wavy or zig-zagged manner such that clamping is thereby effected. It is irrelevant whether the medium passing through the lines 1 is a heating or a cooling medium, or whether the heat is furnished by heating lines or plates (cf. FIG. 14).

What I claim is:

1. A construction for use in a temperature control system, comprising:
   surface means for defining a surface, the surface including projections having tops and boundary surfaces, the surface having defined therein recess sections, each recess section being defined by boundary surfaces of the projections, at least one recess section being a channel-like interspace having an air inlet for entering air and an air outlet for permitting air to exit, the air flowing through the recess sections from the air inlet to the air outlet;
   means for tempering extending within at least part of at least one of the recess sections; and
   covering means for covering the tops of the projections;
   boundary surfaces including parts spaced apart for defining clamping elements for clamping the tempering means, the boundary surfaces further defining baffle means for deflecting the flowing air within at least one recess section in which the tempering means extends for providing temperature equalization.

2. A construction as claimed in claim 1, wherein said surface means comprise a plate element.

3. A construction as claimed in claim 1, wherein said tempering means comprises heat conductive wrapping means extending at least partly over the length of said tempering means.

4. A construction as claimed in claim 3, wherein said wrapping means comprise at least one vane portion extending only over a length sufficient to cover the top of the respective adjacent projections.

5. A construction as claimed in claim 3, wherein said channel-like interspace crosses said tempering means, said wrapping means comprising at least one vane portion bridging said interspace.

6. A construction as claimed in claim 1, wherein said boundary surfaces defining the recess section in which said tempering means extends are aligned along respective building lines having a predetermined distance, the cross-sectional dimension of said tempering means between said building lines being slightly greater than said predetermined distance so as to form said clamping elements.

7. A construction as claimed in claim 1, wherein the recess section in which said tempering means extends forms said channel-like interspace.

8. A construction as claimed in claim 1, wherein at least part of said recess section in which the tempering means extends is substantially wavy.

9. A construction as claimed in claim 1, wherein said projections are pad-shaped and are arranged in a staggered manner on said surface.

10. A construction as claimed in claim 1, wherein the one of said recess sections in which said tempering means extends is arranged on the top of at least part of said projections and forms an angle with said channel-like interspace, thus intersected by said tempering means.

11. A construction as claimed in claim 7, wherein said tempering means intersects at least partly said channel-like interspace to define an intersection, the interspace having an enlargement within the range of said intersection.

12. A construction as claimed in claim 1, further comprising
    second tempering means extending within the recess section in which the first tempering means extends at a height corresponding to the respective cross-sectional dimension of said first tempering means so as to form at least one of said clamping elements.

13. A construction as claimed in claim 1, wherein said channel-like interspace extends in a first dimension parallel to said surface and in a second dimension normal to said surface, said baffle means extending over the whole second dimension.

14. A construction as claimed in claim 1 in which the tempering means is for tempering the air flowing in the recess sections for convectional tempering and for tempering the covering means for radiant tempering.

15. A construction as claimed in claim 1, wherein said clamping means defined by said boundary surfaces extend at least partly laterally of said tempering means for leaving one side of said tempering means accessible during installation of said tempering means in the clamping means.

* * * * *